Patented June 26, 1945

2,378,977

UNITED STATES PATENT OFFICE 2,378,977

POLYMERIC MATERIALS CONTAINING NITROGEN-SUBSTITUTED POLYAMIDES

Merlin Martin Brubaker, Boothwyn, Pa., assignor to E. I. du Pont de Nemours & Company, Wilmington, Del., a corporation of Delaware No Drawing. Application April 11, 1941, Serial No. 388,183

17 Claims. (Cl. 260—37)

This invention relates to polymeric products and more particularly to the manufacture of products comprising intimate mixtures of synthetic linear polyamides with each other, the said polyamides being of types such as identified hereinafter. For convenience, generic reference to the said types will be made at times by denominating them simply as polyamides, which term will be intended, as well, to comprehend the interpolymers mentioned hereinafter. Still more particularly, this invention relates to products such as aforesaid, in which the component polyamides exert special modifying effects on each other in predetermined degree.

The synthetic linear polyamides used in the practice of this invention are of the general type described in Patents 2,071,250, 2,071,253, 2,130,523, and 2,130,948. The polymers there described are high molecular weight products which are generally crystalline in structure showing X-ray powder diffraction patterns in the massive state, and which are capable of being cold drawn into fibers showing by characteristic X-ray patterns molecular orientation along the fiber axis. For the best fiber-forming properties the polymerization reaction should be continued until the intrinsic viscosity is at least 0.4.

These polyamides, generally speaking, comprise the reaction product of a polyamide-forming composition in which the molecules are bifunctional and contain two amide-forming groups, each of which is complementary to an amide-forming group in other molecules in said composition.

These polyamides as outlined above or as otherwise identified hereinafter can be obtained, for example, by self-polymerization of monoamino-monocarboxylic acids, or by reacting a diamine with a dibasic carboxylic acid in substantially equimolecular amounts, it being understood that reference herein to the amino acids, diamines, and dibasic carboxylic acids is intended to include the equivalent amide-forming derivatives thereof. Amide-forming derivatives of the amino acids include the ester, anhydride, amide, lactam, acid halide, N-formyl derivatives. carbamate, and nitrile in the presence of water. Amide-forming derivatives of the dibasic carboxylic acids comprise the mono- and di-ester, the anhydride, the mono- and di-amide, acid halide, and the following compounds in the presence of water: nitrile, cyanocarboxylic acid, cyanoamide, and cyclic imide. Amide-forming derivatives of the diamines include the carbamate. N-formyl derivative and the N,N'-diformyl derivative.

These linear polyamides include also polymers obtained by admixture of other linear polymer-forming reactants, as for instance glycols in the case of polyester amides, with the mentioned polyamide forming reactants. In either instance the amide group is an integral part of the main chain of atoms in the polymer, and, in the case of the preferred polyamides, the average number of carbon atoms separating the amide groups is at least two. It should be noted, however, that the ratio of amide groups to other carbon-non-carbon linkages in the polymer chain should be at least 1:20 if the products are to exhibit polyamide properties to a significant degree.

On hydrolysis with hydrochloric acid the amino acid polymers yield the amino acid hydrochloride, and the diamine-dibasic acid polymers yield the diamine hydrochloride and the dibasic acid.

Although the fiber-forming polyamides are preferred, this invention may also be practiced with the lower molecular weight polyamides obtained from selected reactants or by stopping the polymerization reaction before the fiber-forming stage is reached.

In quest of polyamide compositions possessing a maximum of desirable attributes with a minimum of undesirable attributes, workers in the art already have suggested the formation of products comprising mixtures of preformed polyamides. For example, in Coffman U. S. P. 2,193,529, assigned to the assignee hereof, compositions comprising mixtures of different, separately produced, polyamides are disclosed and claimed, it being pointed out in the specification of the patent that the melting point of such a mixture characteristically is higher than the average melting point of its component polyamides. As also disclosed in the said patent, the mechanical mixing of the polyamides results in a product which preserves to a large extent the superior attributes of the higher-melting component, while combining therewith certain novel advantages. Despite the advance contributed by disclosures such as those contained in the said patent, however, there has continued to exist a great need for polyamide compositions combining with the fiber-forming and other desirable properties most characteristic of the higher-melting varieties of polyamides—i. e., not involving sacrifice of such properties to a deleterious extent—enhanced degrees of softness and resistance to failure at low temperatures, and increased pliability and workability generally, as well as improved dyeing characteristics. The said need has become especially acute in connection with the use of the polyamides in the fabrication of woven textile products, or of films or sheets—either supported or non-supported—appropriate for use in the manufacture of such articles as upholstery, trunks, shoes, weather-proof coatings, wrapping foils, safety glass interlayers, and the like. For a number of these applications the stiffness of ordinary polyamides and interpolyamides has been found to be so great as to necessitate resort to extensive modification or processing treatments. In addition, many of the interpolyamides, as distinguished from the simple polyamides, have been found to be too low melting, and to be especially susceptible to fracture at low temperatures.

This invention has as an object therefore, the production of polyamide compositions fulfilling the said needs. Further objects will appear either expressly or impliedly hereinbelow.

The said objects are accomplished, in accordance with the invention, by plasticizing a polyamide wherein the majority of the amido groups are secondary and which is of the fiber-forming type—i. e., is capable of being cold-drawn into fibers showing by characteristic X-ray patterns orientation along the fiber axis, such capability being dependent, as a rule, on the possession of an intrinsic viscosity (as defined in U. S. P. 2,130,948) of at least 0.4—by heating, at temperatures above 180° C. and below the decomposition temperature, until a homogeneous mixture is obtained—but preferably terminating the heating when homogeneity has been achieved—a melt comprising the said polyamide and at least one further polyamide in which at least 50% of the amido groups are tertiary and the lateral substituents on the amido nitrogens are hydrocarbon groups attached to the nitrogen through aliphatic carbon; the polyamides being blended in such proportions that from 1% to 50% of the amido groups in the resulting composition are tertiary. The plasticized polyamide compositions so obtained are also part of the invention.

In the specification and claims, the term "decomposition temperature," when applied to polyamides, means the temperature of thermal decomposition in the substantial absence of oxygen. In most cases this temperature is above 300° C. The term "secondary amido group" means that, in the amide group

the radical R stands for hydrogen, while the term "tertiary amido group" means that the radical R is an organic substituent, in the present invention a hydrocarbon group attached to the nitrogen atom through aliphatic carbon.

It may be observed, in passing, that the art has heretofore been unaware of the especially unique advantages to be gained by employing as one of the components in fiber-forming or film-forming polyamide compositions those types of polyamides which function outstandingly well as plasticizers for the fiber-forming or film-forming varieties of the polyamides. Hereinafter, for brevity and convenience, the said plasticizer types of polyamides will be referred to, generically, merely as "tertiary amido" polyamides, as distinguished from the polyamides plasticized by them, which latter types will be referred to, generically, merely as "secondary amido" polyamides.

In the preferred practice of the process of the invention the component polyamides are mechanically mixed, and then converted into a melt blend by heating. The heating is continued, preferably with agitation, until the mixture is homogeneous to the eye, that is, until the melt appears to form a single phase without discontinuity, i. e., without suspended drops or other evidence of non-homogeneity. If incompatible extraneous materials such as pigments or fillers are added in advance of the blending, difficulty may be experienced, on occasion, in determining when the blend is homogeneous. In such case the period of time necessary to reach homogeneity conveniently may be ascertained by forming films from the melt at intervals and examining these films, the heating period being deemed to have been sufficient when a clear film, homogeneous to the eye, is obtained. Heating should be discontinued soon after homogeneity of the melt is attained, since further heating has a tendency to lower the melting point of the products.

The heating period necessary to reach homogeneity may be affected by such variables as the composition and viscosity of the polyamides used, the amount of material to be treated, and the degree of agitation, but ordinarily a period of from five to sixty minutes after complete fusion has been effected is sufficient. In the case of the less readily miscible polyamides, one hour or even longer may prove necessary, but as a rule it is particularly advantageous to restrict the heating period to less than one hour.

The temperature of heating should be at least 180° C., first, because few fiber-forming polyamides melt below that temperature, and second, because the viscosity of molten polyamides is in general too high at lower temperatures to permit blending within a reasonably short time; so that even when all the polyamides present melt below 180° C. it is preferable to blend them at a temperature of 180° C. or higher. And in any event, the operating temperature should be such that the highest melting polyamide present is always maintained in the molten state.

It appears likely that some amide interchange takes place during the heating, in view of the increase of plasticity, the lowering of the melting or softening point, and the fact that the individual components become incapable, or substantially incapable, of separation by solvent extraction.

As will be readily apparent to workers in the art, care should be observed to maintain the temperature of the molten mixture, during the operations, below the decomposition point of any of the component polyamides. Also, the operations preferably should be conducted in an inert atmosphere.

In view of the fact that high melting points are especially to be desired in polyamide textile fibers, as well as in the majority of polyamide film and coating applications, and in view of the fact that the tertiary amido polyamides characteristically have unusually low melting points—in fact as low as 100° C., as a rule, and usually even lower—it is desirable that, in the composition resulting from the melt blending process, not more than 50% of the amido groups be tertiary. On the other hand, for the plasticizing effect to be appreciable, the final composition should have at least 1% of its amido groups present as tertiary amido groups. This invention thus includes homogeneously melt-blended polyamides in which from 1 to 50% of the amido groups present are tertiary. The said lower limit of 1% sometimes is sufficient for a definite improvement in dyeing properties, as well, but as a rule at least 5% of the amido groups should be tertiary if, in addition to the plasticization, considerable increase in dyeing affinity is desired. Compositions at the other end of the range, i. e., in which more than 40% of the amido groups are tertiary, sometimes are deficient in toughness. The most preferred compositions, therefore, are those in which from 5 to 40% of the amido groups are tertiary. It may be remarked that such compositions entail only a relatively small sacrifice of melting point.

The tertiary amido polyamides carrying methyl or ethyl radicals as lateral substituents characteristically are more compatible with secondary amido polamides than other varieties of the hereinabove described tertiary amido polyamides, and their use therefore is preferred, in the practice of the invention.

The tertiary amido polyamides generally are liquids or very low melting solids. One of them, poly-N,N'-dimethylpentamethylene succinamide, is described in U. S. P. 2,130,523, and another, poly-N,N'-dimethyltriglycol adipamide, is described hereinbelow. Further new polyamides of the same preferred type, likewise capable of being prepared by the general methods described in U. S. P. 2,130,523 and also in U. S. P. 2,191,556, are poly-N,N'-dimethylhexamethylene adipamide and poly-N,N'-diethylhexamethylene adipamide. These last-mentioned preferred species may be prepared, respectively, as follows (parts by weight).

Preparation of poly-N,N'-dimethylhexamethylene adipamide

N,N'-dimethylhexamethylene diamine (175 parts) in 150 parts of absolute ethanol is added to 178 parts of adipic acid in 500 parts of boiling absolute ethanol and the solution is chilled. The crystalline salt which separates is filtered off and purified by further recrystallization from absolute ethanol. The salt is polymerized by heating it for two hours at 220° C. in a sealed vessel, for one additional hour at 250° C. under atmospheric pressure, and finally for one hour at 250° C. in vacuo. The polymer, poly-N,N'-dimethylhexamethylene adipamide, is a colorless, transparent, viscous fluid which sets to a brittle glass when cooled to −75° C. It has an intrinsic viscosity of 0.59.

Preparation of poly-N,N'-diethylhexamethylene adipamide

N,N'-diethylhexamethylenediamine (88 parts) and 73 parts of adipic acid are dissolved in 250 parts of hot absolute ethanol. The solution is chilled and 2 volumes of ether are added. The crystalline salt is filtered off and recrystallized from absolute ethanol. The diamine-dibasic acid salt is polymerized by heating it for 3.5 hours at 210° C. in a sealed vessel, for two additional hours at 250° C. at atmospheric pressure, and finally for one hour in vacuo at 250° C. The polymer, poly-N,N'-diethylhexamethylene adipamide, is a colorless, transparent, viscous fluid of intrinsic viscosity 0.24. It sets to a brittle glass when cooled to −75° C.

The disecondary diamines used in the foregoing preparations may be prepared as follows (parts by weight):

Four and one-half parts of hexamethylene bromide and 25 parts of essentially anhydrous monomethylamine are sealed in an autoclave equipped with a device for stirring the contents of the autoclave. The mixture is stirred at room temperature for 8 hours, and for 16 additional hours at 50° C. The excess methylamine is then permitted to evaporate and the residual reaction product is treated with 10 parts of caustic and extracted with benzene. The benzene extract is dried with solid caustic and concentrated to remove benzene. The remaining material is fractionated by distillation under reduced pressure and the portion boiling at 104° C. at 20 mm. of mercury is practically pure N,N'-dimethylhexamethylenediamine, N. E.[1] found, 71.80, calculated, 72.

Other disecondary diamines which are suitable for the preparation of the tertiary amido polyamides may be prepared in a similar manner from the reactants tabulated below:

| Reactants | Product |
|---|---|
| 225 parts hexamethylene bromide and 2000 parts monoethylamine | N, N'-diethylhexamethylenediamine, B. P. 110° C./12 mm. N. E.[1] found, 86.7; theory 86.2. |
| 22 parts triglycol dichloride and 140 parts monomethylamine | N, N'-dimethyltriglycoldiamine, B. P. 115° C./12 mm. N. E.[1] found, 86.7; theory 88.1. |

[1] Neutral equivalent.

The hereinabove-mentioned examples illustrating the practice of this invention follow. In each of them parts are by weight, unless otherwise specified.

Example I

Ten parts of poly-N,N'-dimethylhexamethylene adipamide and 90 parts of polyhexamethylene sebacamide are introduced into a vessel from which atmospheric oxygen is exhausted by successive evacuation and admission of purified nitrogen. The vessel and its contents are then heated in a bath of boiling diphenylene oxide vapor (287° C.) until fusion of the contents is complete. Heating, with stirring of the molten mix, is continued for 15 minutes, when the mixture is completely homogeneous to the eye. The mixture then is cooled and the solidified product is converted into thin sheets by pressing at a temperature in the range 190° C. to 220° C.

The properties of the composition prepared as described above are set forth under Item 1 in Table I, below. For economy of space the component polyamides referred to in the said table, as well as those subsequently referred to in Tables II–VII will be designated by letters, as follows:

A—polyhexamethylene adipamide
A'—poly - N,N' - dimethylhexamethylene adipamide
A"—poly-N,N'-diethylhexamethylene adipamide
B—polyhexamethylene sebacamide
C—polydecamethylene sebacamide
D—polytriglycol adipamide
D'—poly-N,N'-dimethyltriglycol adipamide
E—interpolyamide derived from 60 parts of hexamethylenediammonium adipate and 40 parts epsilon-aminocaprolactam
F—interpolyamide derived from 40 parts of hexamethylenediammonium adipate, 30 parts hexamethylenediammonium sebacate, and 30 parts epsilon-aminocaprolactam
G—interpolyamide derived from 50 parts of N,N'-dimethylhexamethylenediammonium adipate and 50 parts hexamethylenediammonium adipate.

Items 2 and 3 in Table I provide data concerning compositions involving the same ingredients as Item 1 thereof but in which the proportions are different.

Items 4–7 of Table I illustrate the fact that the plasticization phenomenon of the invention takes place to a much smaller extent where the product comprises only fiber-forming, difficultly soluble, varieties of polyamides than when it comprises a tertiary polyamide. Thus, items 4–7 serve to furnish a comparative basis for bringing clearly into view the great superiority of the tertiary amido species of polyamides for use as plasticizers for the fiber-forming types, particularly when both hardness and modulus of elasticity are taken into consideration. It will be noted, in this connection, that the data in item 7 pertain to polyhexamethylene sebacamide unmixed with any other species, and that the only difference between the compositions of items 4–6 and 1–3, respectively, is that in items 4–6 the polyhexamethylene adipamide has no substituents on the nitrogen atoms.

The hardness data reported in Example I, as well as those reported in each of the other examples, were determined at 25° C. and at 50% relative humidity. The figure given in the tables, under the heading "Hardness," is the force in grams required to imbed a polished quartz sphere to a uniform depth in a flat polished sample of the product.

It is evident from inspection of the data in item 1 of Table I that the composition set forth therein, i. e. containing 10 parts of the tertiary amido polyamide, is markedly softer and more pliable than either the unmodified polyhexamethylene sebacamide (item No. 7) or the analogous composition set forth in item 4. Likewise, inspection of items 2, 3, 5, and 6 shows that on increasing the proportion of the minor component in the product still further increases in softness and pliability take place; these further increases being much more marked when the minor component polyamide is of the tertiary amido variety.

Table I

| Item | Composition | M. P., °C. | Hardness | Modulus of elasticity of non-oriented films in lbs./sq. in. | Tensile strength in lbs./sq. in. based on original dimensions |
|---|---|---|---|---|---|
| 1 | 10 parts A' and 90 parts B | 202 | 110 | 0.05×10⁶ | 4,300 |
| 2 | 20 parts A' and 80 parts B | 198 | 74 | 0.02×10⁶ | |
| 3 | 40 parts A' and 60 parts B | 192 | 40 | 0.015×10⁶ | 2,500 |
| 4 | 10 parts A and 90 parts B | 207 | 125 | 0.07×10⁶ | 5,000 |
| 5 | 20 parts A and 80 parts B | 208 | 84 | 0.05×10⁶ | |
| 6 | 40 parts A and 60 parts B | 225 | 75 | 0.07×10⁶ | |
| 7 | Unmodified B, included for comparison. | 214 | 130 | 0.09×10⁶ | 5,000 |

EXAMPLE II

Twenty parts of poly-N,N'-dimethyltriglycol adipamide and 80 parts of the interpolyamide prepared from a mixture of 60 parts of hexamethylenediammonium adipate and 40 parts of epsilon-aminocaprolactam are fused and then heated at 287° C., with stirring, for 20 minutes, which time is found sufficient to obtain complete homogeneity. The mixture then is allowed to cool and solidify. One part thereof is dissolved in 4 parts of a mixture of 2 parts of methanol and 1 part of chloroform. The thick, viscous solution obtained in this manner is poured onto a clean glass plate and the solvent is permitted to evaporate overnight. The last traces of solvent are removed by baking in an oven at 65° C. and the film is easily separated from the plate. The properties of this composition are shown as item 2 in Table II below. Items 1 and 3 are other compositions made from these same ingredients in different proportions. Items 4–6 differ from items 1–3, respectively, only in the fact that the polytriglycol adipamide has no substituents on the nitrogen atoms, while item 7 relates only to the interpolyamide of items 1–6 by itself, i. e., unmixed with any other species of polyamide.

The minor component in composition 1–6 may be represented by

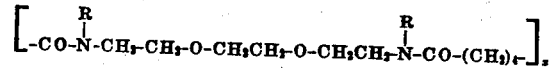

where R is methyl, in items 1–3, and hydrogen, in items 4–6. It will be noted that whereas the product of item 1, containing 10 parts of the tertiary amido polytriglycol adipamide, melts only 5° C. below the corresponding product of item 4, in which the polytriglycol adipamide carries no substituents on the nitrogen atoms, it is markedly softer and more pliable, as well as more resistant to failure at low temperatures, than either the said product of item 4 or, especially, the unmodified interpolyamide of item 7.

Table II

| Item | Composition | M. P., °C. | Hardness | Elastic modulus in lbs./sq. in. | Highest temp. at which immediate failure occurs when films are bent double °C. |
|---|---|---|---|---|---|
| 1 | 10 parts D' and 90 parts E | 180 | 29 | 0.037×10⁶ | −40 to −45 |
| 2 | 20 parts D' and 80 parts E | 175 | 21 | 0.025×10⁶ | |
| 3 | 40 parts D' and 60 parts E | 135 | 15 | 0.016×10⁶ | |
| 4 | 10 parts D and 90 parts E | 185 | 64 | 0.05 ×10⁶ | −20 to −25 |
| 5 | 20 parts D and 80 parts E | 184 | 53 | 0.04 ×10⁶ | |
| 6 | 40 parts D and 60 parts E | 180 | 40 | 0.03 ×10⁶ | |
| 7 | Unmodified E, included for comparison | 187 | 75 | 0.04 ×10⁶ | −5 to −10 |

EXAMPLE III

A mixture composed of 20 parts poly-N,N'-diethylhexamethylene adipamide and 80 parts of the interpolymerization product of 40 parts of hexamethylenediammonium adipate, 30 parts of hexamethylenediammonium sebacate, and 30 parts of epsilon-aminocaprolactam is heated until fusion is complete. The heating with stirring of the molten mix, is continued for 45 minutes at 258° C., when the mixture constitutes a single phase. A film prepared by hot pressing this composition has the properties shown as item 9 in Table III, below. Data respecting other compositions involving these same two ingredients are set out in the table as items 8 and 10. Further compositions prepared in accordance with the invention and each containing, as major component, the same interpolyamide as items 8–10, are shown in items 2–7 in Table III. Examination of the data given for items 8–10 discloses that as the proportion of tertiary amido polyamide in the composition increases, the softness and pliancy of the product likewise increases, and that each of the compositions of the said items is remarkably superior, in these respects as well as in resistance to failure at low temperatures, to the unmodified interpolyamide of item 1. Similarly, the group of compositions in items 2–4, as well as of compositions in items 5–7, exemplify not only the superiority of such compositions over the unmodified interpolyamide, in respect of softness and pliability, but also the fact that as the proportion of the tertiary amido polyamide increases, the said superiority increases correspondingly, to an especially marked extent.

*Table III*

| Item | Tertiary amido polyamide | Parts of F | M. P. °C. | Hardness | Elastic modulus in lbs./sq. in. | Highest temp. at which immediate failure occurs when films are bent double °C. |
|---|---|---|---|---|---|---|
| 1 | None, included for comparison. | 100 | 160 | 65 | $0.032 \times 10^6$ | −15 to −20 |
| 2 | 10 parts A' | 90 | 155 | 42 | $0.028 \times 10^6$ | −20 to −25 |
| 3 | 20 parts A' | 80 | 145 | | $0.022 \times 10^6$ | −30 to −35 |
| 4 | 40 parts A' | 60 | 115 | 17 | $0.012 \times 10^6$ | −20 to −25 |
| 5 | 10 parts D' | 90 | 145 | 26 | $0.025 \times 10^6$ | −35 to −40 |
| 6 | 20 parts D' | 80 | 135 | 25 | $0.019 \times 10^6$ | −25 to −30 |
| 7 | 40 parts D' | 60 | 115 | 14 | $0.013 \times 10^6$ | −20 to −25 |
| 8 | 10 parts A'' | 90 | 155 | 28 | $0.02 \times 10^6$ | −35 to −40 |
| 9 | 20 parts A'' | 80 | 145 | 31 | $0.025 \times 10^6$ | −30 to −35 |
| 10 | 40 parts A'' | 60 | 125 | 8 | $0.005 \times 10^6$ | |

In order to facilitate selection of optimum ingredients and proportions for use in particular applications of the invention, further data with respect to the plasticization of polyamides generally, by incorporating with them tertiary amido species of polyamides, in accordance with the invention, are set forth below in Table IV. Particular attention is directed to the multi-component compositions listed as items 16, 17, 19, 20. In the first two of these a mixture of equal parts of the preformed polyamides, polyhexamethylene adipamide, polyhexamethylene sebacamide, and polydecamethylene sebacamide is plasticized with poly - N,N' - dimethylhexamethylene adipamide. The striking enhancement of the softness and pliability of the product consequent thereof will be apparent on comparing the data in items 16 and 17 with those in item 18.

*Table IV*

| Item | Composition | M. P., °C. | Hardness | Elastic modulus at 25° C., 50% relative humidity, in lbs./sq. in. | |
|---|---|---|---|---|---|
| | | | | Non-oriented hot-pressed films | Hot-pressed films oriented and immersed in boiling water for 15 minutes |
| 1 | 5 parts A' and 95 parts A | 244 | 113 | $0.05 \times 10^6$ | $0.13 \times 10^6$ |
| 2 | 10 parts A' and 90 parts A | 242 | 109 | $0.05 \times 10^6$ | |
| 3 | 20 parts A' and 80 parts A | 239 | 78 | $0.05 \times 10^6$ | $0.04 \times 10^6$ |
| 4 | 35 parts A' and 65 parts A | 237 | 38 | $0.01 \times 10^6$ | |
| 5 | 50 parts A' and 50 parts A | 237 | 18 | $0.01 \times 10^6$ | |
| 6[1] | 100 parts A | 247 | 143 | $0.06 \times 10^6$ | $0.12 \times 10^6$ |
| 7 | 5 parts A' and 95 parts E | 176 | 46 | $0.03 \times 10^6$ | $0.02 \times 10^6$ |
| 8 | 10 parts A' and 90 parts E | 168 | 45 | $0.02 \times 10^6$ | |
| 9 | 20 parts A' and 80 parts E | 166 | 37 | $0.02 \times 10^6$ | |
| 10 | 35 parts A' and 65 parts E | 164 | 12 | $0.01 \times 10^6$ | |
| 11[2] | 100 parts E | 180 | 75 | $0.04 \times 10^6$ | |
| 12 | 10 parts A' and 90 parts F | 155 | 42 | $0.028 \times 10^6$ | |
| 13 | 20 parts A' and 80 parts F | 145 | | $0.022 \times 10^6$ | |
| 14 | 40 parts A' and 60 parts F | 115 | 17 | $0.012 \times 10^6$ | |
| 15[3] | 100 parts F | 160 | 55 | $0.032 \times 10^6$ | |
| 16 | 10 parts A' and 30 parts ea. A, B and C | 200 | 38 | $0.033 \times 10^6$ | |
| 17 | 30 parts A' and 30 parts ea. A, B and C | 193 | 20 | $0.02 \times 10^6$ | $0.017 \times 10^6$ |
| 18[4] | 30 parts ea. A, B and C | 214 | 52 | $0.05 \times 10^6$ | $0.07 \times 10^6$ |
| 19 | 10 parts A' and 45 parts ea. A and C | 230 | 54 | $0.025 \times 10^6$ | $0.07 \times 10^6$ |
| 20 | 30 parts A' and 45 parts ea. A and C | 203 | 28 | $0.01 \times 10^6$ | $0.015 \times 10^6$ |
| 21[5] | 45 parts ea. A and C | 229 | 66 | $0.03 \times 10^6$ | $0.09 \times 10^6$ |
| 22 | 10 parts D' and 90 parts A | 242 | 86 | $0.067 \times 10^6$ | |
| 23 | 20 parts D' and 80 parts A | 235 | 67 | $0.053 \times 10^6$ | |
| 24 | 40 parts D' and 60 parts A | 230 | 50 | $0.032 \times 10^6$ | |
| 25 | 10 parts D' and 90 parts F | 145 | 26 | $0.025 \times 10^6$ | |
| 26 | 20 parts D' and 80 parts F | 135 | 25 | $0.019 \times 10^6$ | |
| 27 | 40 parts D' and 60 parts F | 115 | 14 | $0.013 \times 10^6$ | |
| 28 | 10 parts A'' and 90 parts A | 240 | 91 | $0.05 \times 10^6$ | |
| 29 | 20 parts A'' and 80 parts A | 235 | 74 | $0.04 \times 10^6$ | |
| 30 | 40 parts A'' and 60 parts A | 235 | 46 | $0.01 \times 10^6$ | |

[1] Included for comparison with items 1–5, 22–24, 28–30.
[2] Included for comparison with items 7–10.
[3] Included for comparison with items 12–14, 25–27.
[4] Included for comparison with items 16, 17.
[5] Included for comparison with items 19, 20.

It is also within the scope of the invention to use a mixture of polyamides in which one of the components contains both secondary and tertiary amido groups, as illustrated in the following example.

EXAMPLE IV

A mixture composed of 60 parts of polyhexamethylene adipamide (intrinsic viscosity 0.80, melting point 247° C.) and 40 parts of the interpolymerization product (intrinsic viscosity 0.78, M. P. 160° C.) of 50 parts of N,N'-dimethylhexamethylenediammonium adipate and 50 parts of hexamethylenediammonium adipate is heated in a vapor bath at 285° C. until fusion is complete. The heating, with stirring of the molten mixture, is continued for 15 minutes at 285° C., when the mixture constitutes a single phase. The composition so prepared has the properties listed under item I in Table V, below:

Table V

| Item | Composition | M. P., °C. | Hardness | Elastic modulus at 25° C., 50% relative humidity in lbs./sq. in., non-oriented hot-pressed films |
|---|---|---|---|---|
| 1 | 40 parts G and 60 parts A | 230 | 80 | $0.03 \times 10^6$ |
| 2 | 20 parts A' and 80 parts A (for comparison) | 239 | 78 | $0.05 \times 10^6$ |
| 3 | 100 parts A (for comparison) | 247 | 143 | $0.08 \times 10^6$ |

A number of tertiary amido varieties of polyamides are available, over and above those already mentioned. Thus, especially useful species may be prepared by reacting one or more of the diamines, N,N'-dimethylhexamethylenediamine, N,N'-dimethyldecamethylenediamine, N,N'-diethylhexamethylenediamine, N,N'-diethyldecamethylenediamine, N,N'-dimethyltriglycoldiamine, and N,N'-diethyltriglycoldiamine with one or more of the diacids, succinic, glutaric, adipic, pimelic, suberic, azelaic, sebacic, hendecanedioic, dodecanedioic, tridecanedioic, and tetradecanedioic acids.

The preference for the N-alkyl polyamides in general, and in particular for the N-methyl and N-ethyl polyamides, is based largely on their extraordinary compatibility with all of the ordinary polyamides; but interpolyamides in which only the principal portion of the amide groups is tertiary, also are conspicuously satisfactory as the plasticizer polyamide. It is possible, of course, to employ a plurality of tertiary amido polyamides in the same composition. The molecular weight of the tertiary amido polyamide may vary between intrinsic viscosities ranging from 0.2 to 2.0, the preferred intrinsic viscosity range being from 0.3 to 1.0.

The polyamides to be plasticized ordinarily are of the fiber-forming varieties disclosed in U. S. P. 2,130,948, 2,137,235, 2,141,169, and 2,071,253. Of these, the following are especially appropriate: polypentamethylene adipamide, polyhexamethylene adipamide, polyoctamethylene adipamide, polydecamethylene adipamide, polypentamethylene suberamide, polypentamethylene sebacamide, polyhexamethylene sebacamide, and polyoctamethylene sebacamide. The intrinsic viscosity of the polyamide to be plasticized may lie within the range of 0.4 to 2.0, the preferred viscosity range being from 0.7 to 2.0. Fiber-forming polyester-amides, which may be prepared as described in U. S. P. 2,071,250, likewise may be plasticized in accordance with the invention, as also may be the following: the interpolymerization product of 60 parts of hexamethylenediammonium adipate and 40 parts of epsilon-aminocaproic acid or their amide-forming derivatives; the interpolymerization product of 40 parts of hexamethylenediammonium adipate, 30 parts of hexamethylenediammonium sebacate, and 30 parts of epsilon-aminocaproic acid or their amide-forming derivatives; and the interpolymerization product of 40 parts of hexamethylene diammonium adipate and 30 parts of a mixture (in any proportions) of hexamethylenediammonium azelate and hexamethylenediammonium suberate and 30 parts of epsilon-aminocaproic acid or their amide-forming derivatives.

The fiber-forming, secondary amido polyamides of the previous examples are all of the kind in which all of the amido groups are secondary. It will readily be appreciated, however, that the invention contemplates the use, as the fiber-forming ingredients, of those polyamides which contain a certain proportion of tertiary amido groups, this proportion being such that the polyamide is still fiber-forming (which means, in practice, polyamides in which the majority of the amido groups are secondary, however). For example, it is possible to use an interpolyamide made by reacting 0.75 mole of a diprimary diamine and 0.25 mole of a disecondary diamine with 1 mole of a dicarboxylic acid; or by reacting 0.5 mole of a primary-secondary diamine and 0.5 mole of a diprimary diamine with 1 mole of a dicarboxylic acid. The essential condition is that, in the melt blended polyamide resulting from blending the secondary and the tertiary amido polyamides, at least 1% and not more than 50% of the amido groups shall be tertiary.

The exclusion of air or other oxygen-containing gases from the reaction vessel may be accomplished by blanketing the contents with such inert gases as purified nitrogen, carbon dioxide, or hydrogen. The pressure at which the process is carried out ordinarily is not significant. It may vary from subatmospheric to whatever maximum the reaction vessel will stand.

The time required for the melt-blending already has been discussed. It may be varied within relatively wide limits, provided heating is discontinued as soon as the mixture is homogeneous to the eye. It is within the scope of the invention to combine its process with melt-spinning, e. g., by employing a mechanical mixture of the components in the spinning process, as described, for instance in U. S. P. 2,214,442, and continuing the heating, with stirring, for the requisite period after fusion has been effected, before extruding the melt into filaments, films or the like.

Dyeing of the plasticized polyamides of the invention, after their fabrication into fibers, films or other articles, can be accomplished by methods customarily employed for applying dyestuffs to similar articles formed of other materials. For example, the plasticized polyamides can, like other types of synthetic linear polyamides, be dyed with dyestuffs commonly employed in the dyeing of cellulose acetate fibers. The improved receptivity of the plasticized polyamides of the invention for vat, direct and neutral dyeing acid dyestuffs is illustrated in the following table, VI, wherein data with respect to the melt blend described in item 23 of Table IV are presented, for purposes of illustration. The said melt-blend, prepared from 20% poly-N,N'-dimethyltriglycol adipamide, and 80% polyhexamethylene adipamide, is dyed in oriented film form with members of several classes of dyestuffs, as set forth in the said Table VI, and the results obtained clearly show the increased dye receptivity of the polyhexamethylene adipamide, when plasticized in accordance with the invention, over the receptivity of polyhexamethylene adipamide not so plasticized.

Table VI

| Color index of dye | Concentration of dye bath | Dye absorbed by melt blend comprising 20% D' and 80% A | Dye absorbed by A alone |
|---|---|---|---|
| VAT COLORS | | | |
| Anthraquinone vat dye having Index No. 1163 | Percent 5 | Percent 96 | Percent 40 |
| Anthraquinone vat dye having Index No. 1113 | 5 | 96 | 40 |
| DIRECT COLORS | | | |
| Direct dye having Index No. 368 | 2 | 95 | 25 |
| Direct dye having Index No. 382 | 2 | 95 | 25 |
| Direct dye having Index No. 375 | 2 | 95 | 25 |
| NEUTRAL DYEING ACID COLORS | | | |
| Neutral dyeing acid color having Index No. 114 | 2 | 90 | 25 |
| Neutral dyeing acid color having Index No. 430 | 2 | 90 | 13 |

EXAMPLE V

A mixture of 20% poly-N,N'-dimethylhexamethylene adipamide and 80% polyhexamethylene adipamide, the blend set out in item 3 of Table IV, is melt spun into 25-denier monofils. These are dyed with several colors, and the improvement in the receptivity of the 20% poly-N,N'-dimethylhexamethylene adipamide melt blend over that of polyhexamethylene adipamide for vat and acid dyestuffs is indicated in the following table, VII.

Table VII

| Color index of dye | Concentration of dye bath | Dye absorbed by melt blend comprising 20% A' and 80% A | Dye absorbed by A alone |
|---|---|---|---|
| NEUTRAL DYEING ACID COLORS | | | |
| Neutral dyeing acid dye having Index No. 114 | Percent 2 | Percent 85 | Percent 25 |
| Neutral dyeing acid dye having Index No. 430 | 2 | 80 | 13 |
| VAT COLORS | | | |
| Anthraquinone vat dye having Index No. 1113 | 5 | 80 | 40 |

It may be observed at this point, that whereas vat dyeings on the ordinary polyamides generally crock badly, crocking is almost entirely eliminated when the products of the invention are dyed with vat colors.

It is possible to use the products of the invention either alone or in conjunction with other substances, such as solvents, plasticizers, dyes, cellulosic derivatives, resins, oils, polymers, and so forth.

The utility of the products of the invention, especially when the preferred plasticizer-polyamides are employed in them, in admixture with the fiber-forming varieties, resides not only in their enhanced dyeing characteristics, but also, as brought out hereinabove, in their remarkably increased pliability, softness, and resistance to fracture at low temperatures, compared with the original unmodified fiber-forming polyamides. The marked improvements in these respects greatly extend the field of usefulness of the fiber-forming polyamides. It may be remarked, though, that regardless of the varieties of polyamides which it may be desired to mix, the process of the invention is distinctly superior to solution-blending, e. g., not only for reasons already set forth hereinabove, but also for a number of further reasons, e. g., because of the fact that films or other products formed by evaporation of solvent from a blend produced by mixing of solutions of polyamides at ordinary temperature are usually tacky, whereas when formed from the molten compositions of the invention they are dry and tack-free.

A still further special advantage of the products of the invention consists in the fact that treatment of them with a swelling agent which is a solvent for one of their polyamide components, per se, but is a non-solvent for another of them, per se, does not work the extraction of more than a relatively small portion of the soluble component.

The foregoing advantages, being attained without the expected sacrifice of the characteristic strength and durability of the fiber-forming polyamides, make the products of the invention particularly well suited for use in the manufacture of coated fabrics, unsupported films, foils, molded and shaped articles, fibers, filaments, fabrics, and textiles formed therefrom.

As many apparently widely different embodiments of this invention may be made without departing from the spirit and scope thereof, it is to be understood that I do not limit myself to the specific embodiments thereof except as defined in the appended claims.

I claim:

1. The method of plasticizing a synthetic linear polyamide wherein the majority of the amido groups are secondary and which has an intrinsic viscosity of at least 0.4, said polyamide comprising the reaction product of at least one composition selected from the class consisting of polymerizable monoaminomonocarboxylic acids and mixtures of diamines with dicarboxylic acids, which method comprises the step of heating, at temperatures above 180° C. but below the decomposition temperature, until a homogeneous mixture is obtained, a melt comprising the said polyamide and at least one further synthetic linear polyamide comprising a reaction product as aforesaid and having an intrinsic viscosity of at least 0.2 wherein at least fifty per cent of the amido groups are tertiary and the lateral substituents on the amido nitrogens are hydrocarbon groups attached to the nitrogens through aliphatic carbon the said polyamides being blended in such proportions that 1–50% of the amido groups in the resulting composition are tertiary.

2. A substantially homogeneous melt-blend of at least two pre-formed synthetic linear polyamides each of which comprises the reaction product of at least one composition selected from the class consisting of polymerizable monoaminomonocarboxylic acids and mixtures of diamines with dicarboxylic acids, in one of which polyamides the majority of the amido groups are secondary and the intrinsic viscosity is at least 0.4, and in the other of which polyamides at least fifty per cent of the amido groups are tertiary and the intrinsic viscosity is at least 0.2, and the lateral substituents on the amido nitrogens are hydrocarbon groups attached to the nitrogens through aliphatic carbon, 1–50% of the total of the amido groups in the said melt-blend being tertiary.

3. The product obtained by heating, with agitation for 5–60 minutes, until substantial homogeneity has been achieved, a molten mixture comprising a synthetic linear polyamide wherein the majority of the amido groups are secondary and which has an intrinsic viscosity of at least 0.4, said polyamide comprising the reaction product of at least one composition selected from the class consisting of polymerizable monoaminomonocarboxylic acids and mixtures of diamines with dicarboxylic acids, and at least one other synthetic linear polyamide comprising a reaction product as aforesaid and in which polyamide at least 50% of the amido groups are tertiary and the intrinsic viscosity is at least 0.2 and the lateral substituents on the amido nitrogens are hydrocarbon groups attached to the nitrogens through aliphatic carbon, 5–40% of the total amido groups of both of the said polyamides being tertiary.

4. The product obtained by heating, with agitation for 5–60 minutes, until the said polyamides become substantially incapable of mutual separation by solvent extraction, a molten mixture comprising a synthetic linear polyamide wherein the majority of the amido groups are secondary and which has an intrinsic viscosity of at least 0.4, said polyamide comprising the reaction product of at least one composition selected from the class consisting of polymerizable monoaminomonocarboxylic acids and mixtures of diamines with dicarboxylic acids, and at least one other synthetic linear polyamide comprising a reaction product as aforesaid and in which polyamide at least 50% of the amido groups are tertiary and the intrinsic viscosity is at least 0.2 and the lateral substituent on the amido nitrogens is a saturated aliphatic hydrocarbon radical having not more than two carbon atoms, 5–40% of the total amido groups of both of the said polyamides being tertiary.

5. The product set forth in claim 3 wherein the first-mentioned polyamide therein is polyhexamethylene adipamide.

6. The product set forth in claim 3 wherein the first-mentioned polyamide therein is an interpolymerization product of hexamethylenediammonium adipate and epsilon-aminocaproic acid.

7. The product set forth in claim 3 wherein the first-mentioned polyamide therein is an interpolymerization product of hexamethylenediammonium adipate, hexamethylenediammonium azelate, hexamethylenediammonium suberate, and epsilon-aminocaproic acid.

8. The product set forth in claim 3 wherein the second-mentioned polyamide therein is poly-N,N'-dimethyltriglycol adipamide.

9. A shaped object consisting essentially of the solidification product of the molten mixture set forth in claim 4 and treated in accordance therewith, wherein the first-described polyamide of the said claim 4 per se has a melting point of at least 150° C. and the second-described polyamide of the said claim 4 per se has a melting point below 100° C.

10. An article of manufacture comprising the first-mentioned synthetic linear polyamide of claim 1, plasticized in accordance with the method of the said claim 1.

11. The solidified first-mentioned synthetic linear polyamide of claim 1, plasticized as set forth in the said claim 1, wherein 5–40% of the total of the amido groups of both of the said polyamides are tertiary.

12. A shaped object comprising a dyed synthetic linear polyamide wherein the majority of the amido groups are secondary and which has an intrinsic viscosity of at least 0.4, the said polyamide comprising the reaction product of at least one composition selected from the class consisting of polymerizable monoaminomonocarboxylic acids and mixtures of diamines with dicarboxylic acids and said polyamide having been plasticized in accordance with the method of claim 1, in advance of dyeing.

13. An article of manufacture comprising the first-mentioned synthetic linear polyamide of claim 1, plasticized in accordance with the method of the said claim 1, and containing a vat dyestuff.

14. An article of manufacture comprising the first-mentioned synthetic linear polyamide of claim 1, plasticized in accordance with the method of the said claim 1, and having embodied therein a direct dyestuff.

15. An article of manufacture comprising the first-mentioned synthetic linear polyamide of claim 1, plasticized in accordance with the method of the said claim 1, and dyed with an acid dyestuff.

16. The product set forth in claim 3 wherein the second mentioned polyamide therein is poly-N,N₂-dimethylhexamethylene adipamide.

17. The product set forth in claim 3 wherein the second mentioned polyamide therein is the interpolymerization product of 50 parts of N,N'-dimethylhexamethylenediammonium adipate and 50 parts of hexamethylenediammonium adipate.

MERLIN MARTIN BRUBAKER.